(12) United States Patent
Hong et al.

(10) Patent No.: US 11,535,693 B2
(45) Date of Patent: Dec. 27, 2022

(54) COMPOSITION FOR FORMING POLYURETHANE FILM, POLYURETHANE-FILM DERIVED THEREFROM AND ARTICLE COMPRISING THE SAME

(71) Applicant: KOREA INSTITUTE OF INDUSTRIAL TECHNOLOGY, Cheonan-si (KR)

(72) Inventors: Sung Woo Hong, Seongnam-si (KR); Sung Koo Lee, Seongnam-si (KR); Pyong Hwa Hong, Seoul (KR); Jin Sil Kim, Cheonan-si (KR); Gyeong Min Moon, Suwon-si (KR); Kiseung Kim, Suwon-si (KR)

(73) Assignee: Korea Institute of Industrial Technology, Cheonan-si (KR)

( * ) Notice: Subject to any disclaimer, the term of this patent is extended or adjusted under 35 U.S.C. 154(b) by 0 days.

(21) Appl. No.: 17/101,812

(22) Filed: Nov. 23, 2020

(65) Prior Publication Data

US 2021/0155739 A1 May 27, 2021

(30) Foreign Application Priority Data

Nov. 22, 2019 (KR) .................. 10-2019-0151592

(51) Int. Cl.

| | | |
|---|---|---|
| C08G 18/12 | (2006.01) | |
| C08L 75/12 | (2006.01) | |
| C08G 18/32 | (2006.01) | |
| C08G 18/62 | (2006.01) | |
| C08G 18/38 | (2006.01) | |
| C09D 175/04 | (2006.01) | |
| C08G 18/65 | (2006.01) | |
| C08G 18/75 | (2006.01) | |
| C08G 18/10 | (2006.01) | |
| C08G 18/64 | (2006.01) | |
| C08G 18/79 | (2006.01) | |

(52) U.S. Cl.
CPC ............ *C08G 18/12* (2013.01); *C08G 18/10* (2013.01); *C08G 18/3212* (2013.01); *C08G 18/3271* (2013.01); *C08G 18/3829* (2013.01); *C08G 18/6204* (2013.01); *C08G 18/6216* (2013.01); *C08G 18/6225* (2013.01); *C08G 18/6229* (2013.01); *C08G 18/6415* (2013.01); *C08G 18/65* (2013.01); *C08G 18/758* (2013.01); *C08G 18/791* (2013.01); *C08L 75/12* (2013.01); *C09D 175/04* (2013.01); *C08G 2150/00* (2013.01); *C08L 2203/16* (2013.01)

(58) Field of Classification Search
CPC ............... C08G 18/12; C08G 18/3212; C08G 18/3829; C08G 18/6229; C08G 2150/00; C08G 18/6415; C08G 18/3271; C08G 18/6216; C08G 18/65; C08G 18/758; C08G 18/791; C08G 18/10; C08G 18/6204; C08G 18/6225; C08L 75/12; C08L 2203/16; C09D 175/04
See application file for complete search history.

(56) References Cited

U.S. PATENT DOCUMENTS

| | | | |
|---|---|---|---|
| 4,248,910 A * | 2/1981 | Pedain | ..................... D06N 3/14 427/208.4 |
| 4,349,663 A | 9/1982 | Barsa et al. | |
| 4,413,111 A * | 11/1983 | Markusch | .............. C08G 18/10 528/59 |
| 4,439,593 A * | 3/1984 | Kelso | ................ C08G 18/8093 528/45 |
| 4,546,116 A * | 10/1985 | Muller | .................. C08G 18/14 521/106 |
| 5,098,949 A | 3/1992 | Sakamoto et al. | |
| 6,887,937 B1 | 5/2005 | Vandevoorde et al. | |

FOREIGN PATENT DOCUMENTS

| | | |
|---|---|---|
| EP | 0865461 B1 | 1/2002 |
| JP | S63287943 A | 11/1988 |
| JP | H10158358 A | 6/1998 |
| JP | 2001525883 A | 12/2001 |
| KR | 1020130115234 A | 10/2013 |

* cited by examiner

*Primary Examiner* — Rabon A Sergent
(74) *Attorney, Agent, or Firm* — Rabin & Berdo, P.C.

(57) ABSTRACT

Disclosed is a composition for forming a polyurethane film with improved reaction stability, comprising an OH group-containing polymer; an isocyanate-based compound as a curing agent; and an alicyclic urea diol compound having two urea groups and an OH group at two terminals, and a polyurethane film with improved self-healable property from tear, derived from the composition.

7 Claims, 2 Drawing Sheets

<comparative example 1>    <example 1>

COMPOSITION FOR FORMING POLYURETHANE FILM, POLYURETHANE-FILM DERIVED THEREFROM AND ARTICLE COMPRISING THE SAME

TECHNICAL FIELD

The present disclosure relates to a composition for forming a polyurethane film, a polyurethane film derived therefrom, and an article comprising the same.

The present application claims the benefit of Korean Patent Application No. 10-2019-0151592 filed on Nov. 22, 2019 with the Korean Intellectual Property Office, the disclosure of which is incorporated herein by reference in its entirety.

BACKGROUND ART

Polyurethane is a typical compound used in a film/coating for automotive exterior components. The urethane bonds of the polyurethane may be formed by bonds between a hydroxyl (OH) group and an isocyanate (NCO) group.

The polyurethane may be classified into a linear polyurethane and a crosslinked polyurethane. One method for preparing the linear polyurethane includes condensation reaction between a polyol having two hydroxyl groups and a diisocyanate compound. Additionally, an exemplary method for preparing the crosslinked polyurethane includes condensation reaction between a polyol having two or more hydroxyl groups and an isocyanate compound including three or more NCO groups, or condensation reaction between a polyol having three or more hydroxyl groups and a diisocyanate compound, but is not limited thereto.

A composition for forming the polyurethane, i.e., a composition for forming a polyurethane film is suitable for forming a coating film used in automotive exterior components in terms of fabrication cost, low temperature cure and adhesion to a substrate.

However, a polyurethane with elastic recovery (for example, Scratch Shield® from Nissan Paint, Japan) is well known as the conventional composition for forming a polyurethane film and a polyurethane film obtained therefrom, but the polyurethane elastic recovery has a self-healable property due to the elasticity, but lacks a self-healable property from tear. To solve this disadvantage, suggestion has been made to introduce an amine compound to the conventional composition for forming a polyurethane film to improve the self-healable property, but an unintentional reaction occurs in the composition for forming a polyurethane film with the amine compound due to the strong reactivity of amine, failing to obtain an intended polyurethane film.

DISCLOSURE

Technical Problem

The present disclosure is designed to solve the above-described problems, and therefore the present disclosure is directed to providing a composition for forming a polyurethane film with improved reaction safety.

The present disclosure is further directed to providing a polyurethane film derived from the composition for forming a polyurethane film, with improved self-healable property from tear.

The present disclosure is further directed to providing an article comprising the polyurethane film.

Technical Solution

According to an aspect of the present disclosure, in a first embodiment of the present disclosure, there is provided a composition for forming a polyurethane film comprising an OH group-containing polymer; an isocyanate-based compound as a curing agent; and an alicyclic urea diol compound having two urea groups and an OH group at two terminals.

According to a second embodiment of the present disclosure, in the first embodiment, the OH group-containing polymer may comprise an OH group-containing polyacrylate-based compound; an OH group-containing polymethacrylate-based compound; an OH group-containing polystyrene-based compound; a polymer comprising a repeat unit derived from two or more monomers selected from an OH group-containing acrylate-based monomer, an OH group-containing methacrylate-based monomer or an OH group-containing styrene-based monomer; or a combination thereof.

According to a third embodiment of the present disclosure, in the first or second embodiment, the alicyclic urea diol compound may be included in an amount of 0.5 to 50 parts by weight based on 100 parts by weight of the composition for forming a polyurethane film.

According to a fourth embodiment of the present disclosure, in any one of the first to third embodiments, the alicyclic urea diol compound may be represented by the following Formula 1:

[Formula 1]

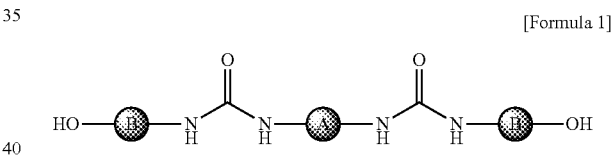

where A is any one selected from the group consisting of a substituted or unsubstituted cycloalkylene group having 3 to 30 carbon atoms, a substituted or unsubstituted cycloalkylenedialkylene group having 5 to 30 carbon atoms, and a substituted or unsubstituted alkylenedicycloalkylene group having 7 to 30 carbon atoms, and B is any one selected from the group consisting of a substituted or unsubstituted alkylene group having 1 to 10 carbon atoms, a substituted or unsubstituted alkenylene group having 2 to 10 carbon atoms, a substituted or unsubstituted alkynylene group having 2 to 10 carbon atoms, a substituted or unsubstituted cycloalkylene group having 3 to 10 carbon atoms, and a substituted or unsubstituted arylene group having 6 to 20 carbon atoms; or divalent linking group in which at least two of them are bonded.

According to a fifth embodiment of the present disclosure, in the fourth embodiment, the A may be any one selected from the group consisting of substituted or unsubstituted, cyclohexylene group, cyclohexylenedimethylene group, cyclohexylenediethylene group, cyclohexylenedipropylene group, cyclohexylenedibutylene group, methylenedicyclohexylene group, ethylenedicyclohexylene group, propylenedicyclohexylene group, and butylenedicyclohexylene group, and the B may be any one selected from the group consisting of substituted or unsubstituted, methylene group, ethylene group, propylene group, isopropylene group, butylene group, sec-butylene group, t-butylene group, n-butylene group, pentylene group, hexylene group, cyclopropylene group, cyclobutylene group, cyclopentylene group, cyclohexylene group, and phenylene group.

According to a sixth embodiment of the present disclosure, in any one of the first to fifth embodiments, the alicyclic urea diol compound may comprise at least one of 1,1'-(cyclohexane-1,2-diyl)bis-(3-(hydroxymethyl)urea), 1,1'-(cyclohexane-1,3-diyl)bis-(3-(hydroxymethyl)urea), 1,1'-cyclohexane-1,4-diyl)bis-(3-(hydroxymethyl)urea), 1,1'-(cyclohexane-1,2-diyl)bis-(3-(hydroxyethyl)urea), 1,1'-(cyclohexane-1,3-diyl)bis-(3-(hydroxyethyl)urea), 1,1'-cyclohexane-1,4-diyl)bis-(3-(hydroxyethyl)urea), 1,1'-(cyclohexane-1,2-diylbis(methylene))bis-(3-(hydroxymethyl)urea), 1,1'-(cyclohexane-1,3-diylbis(methylene))bis-(3-(hydroxymethyl)urea), 1,1'-cyclohexane-1,4-diylbis(methylene))bis-(3-(hydroxymethyl)urea), 1,1'-(cyclohexane-1,2-diylbis(methylene))bis-(3-(hydroxyethyl)urea), 1,1'-(cyclohexane-1,3-diylbis(methylene))bis-(3-(hydroxyethyl)urea), or 1,1'-cyclohexane-1,4-diylbis(methylene))bis-(3-(hydroxyethyl)urea).

According to another aspect of the present disclosure, in a seventh embodiment of the present disclosure, there is provided a polyurethane film derived from the composition for forming a polyurethane film according to any one of the first to sixth embodiments.

According to still another aspect of the present disclosure, in an eighth embodiment of the present disclosure, there is provided an article comprising a substrate, and the polyurethane film according to the seventh embodiment, positioned on at least one surface of the substrate.

According to a ninth embodiment of the present disclosure, in the eighth embodiment, the substrate may be a metal substrate, a glass substrate or a polymer substrate.

Advantageous Effects

As described above, the composition for forming a polyurethane film according to an embodiment of the present disclosure comprises an OH group-containing polymer and an isocyanate-based compound as a curing agent that form a polyurethane, and further comprises an alicyclic urea diol compound to improve the reaction safety. Additionally, the polyurethane film obtained from the composition for forming a polyurethane film according to an embodiment of the present disclosure is the future smart coating technology for self-healing of surface damage caused by external stimuli, and is expected to significantly improve the quality in the field of coating for transportation devices including vehicles, aircraft and ship continuously exposed to the extreme external environment and in the field of exterior preservation of electronic products including smartphones, tablet PCs and displays. In particular, the polyurethane film has improved the self-healable property from tear.

DETAILED DESCRIPTION

Figure 1:
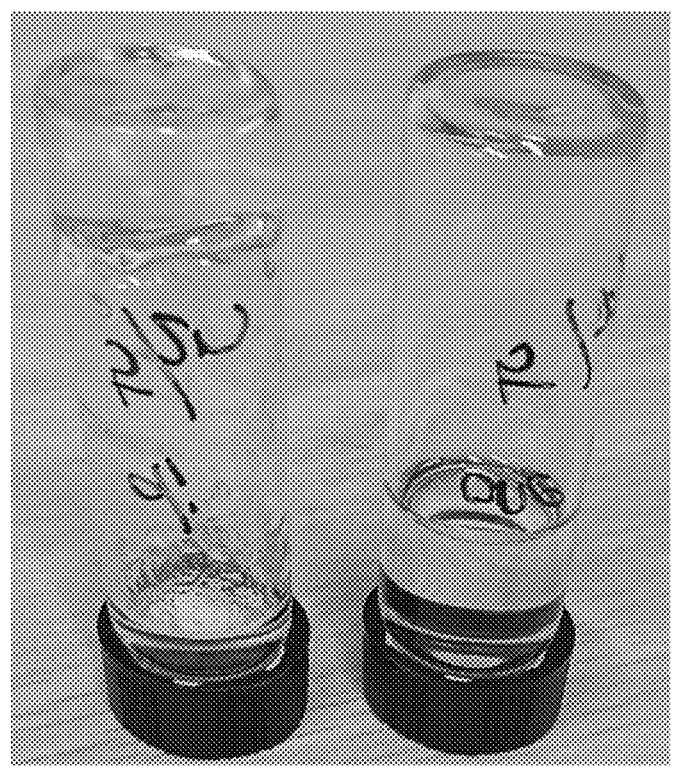
FIG. 1 is a photographic image showing the reaction safety of a composition for forming a polyurethane film of each of example 1 and comparative example 1 over time.

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, configuration shown in the embodiments described herein is just a most preferred embodiment, and does not fully represent the technical aspects of the disclosure, so it should be understood that other equivalents and modifications could have been made thereto at the time of filing the application.

The composition forming a polyurethane film according to an aspect of the present disclosure comprises an OH group-containing polymer; an isocyanate-based compound as a curing agent; and an alicyclic urea diol compound having two urea groups and an OH group at two terminals.

The OH group-containing polymer may comprise an OH group-containing polyacrylate-based compound; an OH group-containing polymethacrylate-based compound; an OH group-containing polystyrene-based compound; a polymer including the repeat unit derived from two or more monomers selected from an OH group-containing acrylate-based monomer, an OH group-containing methacrylate-based monomer, or an OH group-containing styrene-based monomer or a mixture thereof.

In this instance, the OH group-containing acrylate-based monomer, the OH group-containing methacrylate-based monomer, and the OH group-containing styrene-based monomer refer respectively to substitution of at least one of hydrogens of the acrylate-based monomer, the methacrylate-based monomer and the styrene-based monomer with an OH group (a hydroxyl group). Additionally, the OH group-containing polyacrylate-based compound, the OH group-containing polymethacrylate-based compound, and the OH group-containing polystyrene-based compound may be respectively a monopolymer of each of the OH group-containing polyacrylate-based monomer, the OH group-containing methacrylate-based monomer and the OH group-containing styrene-based monomer. The OH group-containing polyacrylate-based compound may be a copolymer comprising a repeat unit derived from the acrylate based monomer and a repeat unit derived from a monomer other than the acrylate-based monomer. The OH group-containing polymethacrylate-based compound may be a copolymer comprising a repeat unit derived from the methacrylate based monomer and a repeat unit derived from a monomer other than the methacrylate based monomer. The OH group-containing polystyrene-based compound may be a copolymer comprising a repeat unit derived from the styrene based monomer and a repeat unit derived from a monomer other than the styrene based monomer.

The OH group-containing polymer may have the number average molecular weight ranging from 100 to 1,000,000, from 100 to 100,000, from 100 to 10,000, or from 100 to 5,000. When the number average molecular weight of the polymer satisfies the above-described range, it may be advantageous in terms of the mechanical properties of coating and film.

The curing agent of the present disclosure may be an isocyanate-based compound, to be specific, a multifunctional isocyanate containing two or more isocyanate groups.

The multifunctional isocyanate according to an embodiment of the present disclosure may be an aliphatic, aromatic, alicyclic, or aralphatic compound containing two or more isocyanate groups in the molecule structure.

In the multifunctional isocyanate compound, the aliphatic isocyanate compound may be at least one of aliphatic isocyanate selected from the group consisting of ethylene diisocyanate, trimethylene diisocyanate, tetramethylene diisocyanate, hexamethylene diisocyanate (HMDI), octamethylene diisocyanate, nonamethylene diisocyanate, dodecamethylene diisocyanate, 2,2-dimethylpentane diisocyanate, 2,2,4-trimethyl hexamethylene diisocyanate, decamethylene diisocyanate, butene diisocyanate, 1,3-butadiene-1,4-diisocyanate, 2,4,4-trimethyl hexamethylenediisocyanate, 1,6,11-undecane triisocyanate, 2,2,4-trimethylhexamethylene diisocyanate, lysine diisocyanate, 2,6-diisocyanatemethylcaproate, bis(2-isocyanateethyl) fumarate, bis(2-isocyanateateethyl)carbonate, 2-isocyanateethyl-2,6-diisocyanatehexanoate, 1,3,5-hexamethylenetriisocyanate, 1,8-diisocyanato-4-isocyanate, bis(isocyanatoethyl)ether, 1,4-butyleneglycoldipropylether-ω, ω'-diisocyanate, lysine diisocyanato methylester, lysine triisocyanate, 2-isocyanatoethyl-2,6-diisocyanato ethyl-2,6-diisocyanato hexanoate, 2-isocyanato propyl-2,6-diisocyanato hexanoate, 2,6-di(isocyanatomethyl)furan, 1,3-bis(6-isocyanatohexyl)-uretidine-2,4-dione, and 1,3,5-tris(6-isocyanatohexyl)isocyanurate.

In the multifunctional isocyanate compound, the aromatic isocyanate may be phenylene 1,4-diisocyanate, tolylene 2,4- and/or 2,6-diisocyanate (TDI), naphthalene 1,5-diisocyanate, diphenylmethane 2,2'- and/or 2,4'-, and/or 4,4'-diisocyanate (MDI) and/or high homology (polymeric diphenylmethane diisocyanate) (pMDI).

In the multifunctional isocyanate compound, the alicyclic isocyanate may be at least one of alicyclic isocyanate selected from the group consisting of isophorone diisocyanate (IPDI), 4,4'-dicyclohexylmethane diisocyanate, cyclohexylene diisocyanate, methylcyclohexylene diisocyanate, bis(2-isocyanateethyl)-4-cyclohexane-1,2-dicarboxylate, 2,5-norbornane diisocyanate, 2,6-norbornane diisocyanate, 2,2-dimethyl dicyclohexylmethane diisocyanate, bis(4-isocyanato-n-butylidene)pentaerythritol, dimer acid diisocyanate, 2-isocyanatomethyl-3-(3-isocyanato propyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo[2.1.1]-heptane, 2-isocyanatomethyl-2-(3-isocyanatopropyl)-6-(2-isocyanatoethyl)-bicyclo[2.2.1]-heptane, and norbornane bis(isocyanatomethyl).

In the multifunctional isocyanate compound, the araliphatic isocyanate may be at least one of araliphatic isocyanate selected from the group consisting of 1,3-bis(isocyanatomethyl)benzene(m-xylene diisocyanate, m-XDI), 1,4-bis(isocyanatomethyl)benzene(p-xylene diisocyanate, p-XDI), 1,3-bis(2-isocyanato propan-2-yl)benzene(m-tetramethyl xylene diisocyanate, m-TMXDI), 1,3-bis(isocyanatomethyl)-4-methylbenzene, 1,3-bis(isocyanatomethyl)-4-ethylbenzene, 1,3-bis(isocyanatomethyl)-5-methylbenzene, 1,3-bis(isocyanatomethyl)-4,5-dimethylbenzene, 1,4-bis(isocyanatomethyl)-2,5-dimethylbenzene, 1,4-bis(isocyanatomethyl)-2,3,5,6-tetramethylbenzene, 1,3-bis(isocyanatomethyl)-5-tert-butyl benzene, 1,3-bis(isocyanatomethyl)-4-chlorobenzene, 1,3-bis(isocyanatomethyl)-4,5-dichlorobenzene, 1,3-bis(isocyanatomethyl)-2,4,5,6-tetrachloro benzene, 1,4-bis(isocyanatomethyl)-2,3,5,6-tetrachloro benzene, 1,4-bis(isocyanatomethyl)-2,3,5,6-tetrabromo benzene, 1,4-bis(2-isocyanatoethyl)benzene, 1,4-bis(isocyanatomethyl) naphthalene, xylylene diisocyanate, bis(isocyanatoethyl) benzene, bis(isocyanato propyl)benzene, α,α,α',α'-tetramethyl xylylene diisocyanate, bis(isocyanato butyl) benzene, bis(isocyanato propyl)naphthalene, bis(isocyanatomethyl)diphenylether, and bis(isocyanatoethyl) phthalate.

The multifunctional isocyanate according to an embodiment of the present disclosure may be 1,3,5-triazine-2,4,6 (1H, 3G, 5H)trione.

In the composition for forming a polyurethane film according to an embodiment of the present disclosure, a composition ratio of the OH group-containing polymer and the curing agent may be basically determined, taking into account the stoichiometric reaction of the OH group in the OH group-containing polymer and in the alicyclic urea diol, and the isocyanate group included in the isocyanate compound as the curing agent. According to the present disclosure, the amount of the OH group-containing polymer and the curing agent may be determined taking into account the fact that the OH group is included in both the OH group-containing polymer and the alicyclic urea diol.

In an embodiment of the present disclosure, in the composition for forming a polyurethane film, mol % of the repeat unit having the OH group in the OH group-containing polymer is a factor that determines the mechanical properties of the polyurethane film, and may be different depending on the purpose of use, and may range between more than 0 mol % and 100 mol % or less, between 1 mol % and 100 mol %, or between 1 mol % and 50 mol %.

Additionally, the degree of crosslinking of the OH group in the OH group-containing polymer and in the alicyclic urea diol with NCO in the curing agent may be different depending on the purpose of use of the polyurethane film.

According to an embodiment of the present disclosure, a ratio of the total number of isocyanate groups in the curing agent to the total number of the OH group in the OH group-containing polymer and in the alicyclic urea diol (a ratio of NCO/OH numbers) may be 0.5 to 1.5, 0.85 to 1.5, or 1 to 1.5 depending on the purpose of use. When the ratio of NCO/OH numbers satisfies the above-described range, the mechanical properties, the optical properties and the self-healable property may be suited for the purpose of use of the final film or the coating material.

In the present disclosure, the alicyclic urea diol compound refers to a compound having two urea groups, an alicyclic functional group between the two urea groups, and an OH group at two terminals. As the alicyclic urea diol compound includes two OH groups in the molecule, the alicyclic urea diol compound may form urethane bonds by reaction with the isocyanate compound.

When the alicyclic urea diol compound included in the composition for forming a polyurethane film according to the present disclosure forms a polyurethane film together with the OH group-containing polymer and the isocyanate-based compound as the curing agent, the urea group derived from the alicyclic urea diol compound may form strong hydrogen bonds with an NH group of the urethane group of the polyurethane film. As a result, the polyurethane film derived from the composition for forming a polyurethane film comprising the alicyclic urea diol compound according to the present disclosure has a very high self-healable property from tear.

To introduce the urea group to the polyurethane, when an amine compound is added to the composition for forming a polyurethane film, reaction occurs between the amine and the curing agent in the composition for forming a polyurethane film due to the strong reactivity of the amine, failing to apply the composition for forming a polyurethane film to a film process and a coating process.

The composition for forming a polyurethane film according to the present disclosure comprises the alicyclic urea diol compound including the urea group to remarkably improve the storage safety of the composition for forming a polyurethane film, and smoothly introduce the urea group to the polyurethane film.

Additionally, the alicyclic urea diol compound has better optical properties than the aliphatic urea diol compound and the aromatic urea diol compound. The aliphatic urea diol compound has high mechanical strength but poor optical properties. The aromatic urea diol compound has good optical properties but low mechanical strength. The alicyclic urea diol compound has the intermediate properties between the aliphatic urea diol compound and the aromatic urea diol compound, and thus has good optical properties and high mechanical strength. Here, the aliphatic urea diol compound refers to a compound having two urea groups, an aliphatic functional group between the two urea groups, and an OH group at two terminals. Additionally, the aromatic urea diol compound refers to a compound having two urea groups, an aromatic functional group between the two urea groups, and an OH group at two terminals.

The alicyclic urea diol compound may be prepared by reaction between a compound having an NH$_2$ group (an amino group) and an OH group (a hydroxyl group) at two terminals, and an alicyclic compound having an isocyanate group at each of two terminals. For example, the compound having the NH$_2$ group (an amino group) and the OH group (a hydroxyl group) at each of the two terminals may be 2-aminomethanol, 2-aminoethanol, 2-aminopropanol, or 2-aminobutanol, but is not limited thereto. The alicyclic compound having the isocyanate group at each of the two terminals may be, for example, 1,2-diisocyanatocyclohexane, 1,3-diisocyanatocyclohexane, 1,4-diisocyanatocyclohexane, 1,2-bis(isocyanatomethyl)cyclohexane, 1,3-bis(isocyanatomethyl)cyclohexane, 1,4-bis(isocyanatomethyl)cyclohexane, 1,2-bis(isocyanatoethyl)cyclohexane, 1,3-bis(isocyanatoethyl)cyclohexane, 1,4-bis(isocyanatoethyl)cyclohexane, bis(2-isocyanatocyclohexyl)methane, bis(3-isocyatanocyclohexyl)methane, bis(4-isocyanatocyclohexyl)methane, bis(2-isocyanatocyclohexyl)ethane, bis(3-isocyatanocyclohexyl)ethane, or bis(4-isocyanatocyclohexyl)ethane, but is not limited thereto.

In a specific embodiment of the present disclosure, the alicyclic urea diol compound may be represented by the following Formula 1:

[Formula 1]

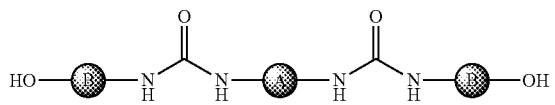

In the above Formula 1,

A is any one selected from the group consisting of a substituted or unsubstituted cycloalkylene group having 3 to 30 carbon atoms, a substituted or unsubstituted cycloalkylenedialkylene group having 5 to 30 carbon atoms, and a substituted or unsubstituted alkylenedicycloalkylene group having 7 to 30 carbon atoms, and B is any one selected from the group consisting of a substituted or unsubstituted alkylene group having 1 to 10 carbon atoms, a substituted or unsubstituted alkenylene group having 2 to 10 carbon atoms, a substituted or unsubstituted alkynylene group having 2 to 10 carbon atoms, a substituted or unsubstituted cycloalkylene group having 3 to 10 carbon atoms, and a substituted or unsubstituted arylene group having 6 to 20 carbon atoms; or divalent linking group in which at least two of them are bonded.

The substituted or unsubstituted cycloalkylene group having 3 to 30 carbon atoms as used herein refers to a substituted or unsubstituted divalent monocyclic system having 3 to 30 carbon atoms. The cycloalkylene group may be a substituted or unsubstituted cycloalkylene group having 3 to 30 carbon atoms, a substituted or unsubstituted cycloalkylene group having 3 to 12 carbon atoms, or a substituted or unsubstituted cycloalkylene group having 3 to 6 carbon atoms. For example, one or more hydrogen atoms included in the cycloalkylene group may be substituted with a halogen atom, a hydroxyl group, —SH, a nitro group,

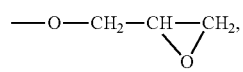

a cyano group, a substituted or unsubstituted amino group (—NH$_2$, —NH(R), —N(R')(R'')) wherein each of R, R' and R'' is independently an alkyl group having 1 to 10 carbon atoms, an amidino group, hydrazine, a hydrazone group, a carboxyl group, a sulfonate group, a phosphate group, an alkyl group having 1 to 20 carbon atoms, a halogenated alkyl group having 1 to 20 carbon atoms, an alkenyl group having 1 to 20 carbon atoms, an alkynyl group having 1 to 20 carbon atoms, a heteroalkyl group having 1 to 20 carbon atoms, an aryl group having 6 to 20 carbon atoms, an arylalkyl group having 6 to 20 carbon atoms, a heteroaryl group having 6 to 20 carbon atoms, or a heteroarylalkyl group having 6 to 20 carbon atoms.

The substituted or unsubstituted cycloalkylenedialkylene group having 5 to 30 carbon atoms refers to a hydrocarbon group having 5 to 30 carbon atoms and a substituted or unsubstituted —R1R2R3—structure. The R1 and R3 are alkylene groups, and the R2 is a cycloalkylene group. The cycloalkylenedialkylene group may be a cycloalkylenedialkylene group having 8 to 14 carbon atoms. For the alkylene group, refer to the following. For the cycloalkylene group, a reference is made to the above description. For example, one or more hydrogen atoms included in the alkylene group and the cycloalkylene group may be substituted in the same way as the above-described cycloalkylene group.

The substituted or unsubstituted alkylenedicycloalkylene group having 7 to 30 carbon atoms refers to a hydrocarbon group having 7 to 30 carbon atoms and a substituted or unsubstituted —R1R2R3—structure. The R1 and R3 are cycloalkylene groups, and the R2 is an alkylene group. The alkylenedicycloalkylene group may be an alkylenedicycloalkylene group having 13 to 16 carbon atoms. For the alkylene group, refer to the following. For the cycloalkylene group, a reference is made to the above description. For example, one or more hydrogen atoms included in the alkylene group and the cycloalkylene group may be substituted in the same way as the above-described cycloalkylene group.

The substituted or unsubstituted alkylene group having 1 to 10 carbon atoms refers to a substituted or unsubstituted straight-chain or branched saturated divalent hydrocarbon group having 1 to 10 carbon atoms. The alkylene group may be a substituted or unsubstituted alkylene group having 1 to 6 carbon atoms, or a substituted or unsubstituted alkylene group having 1 to 3 carbon atoms. For example, one or more hydrogen atoms included in the alkylene group may be substituted in the same way as the above-described cycloalkylene group.

The substituted or unsubstituted alkenylene group having 2 to 10 carbon atoms refers to a substituted or unsubstituted straight-chain or branched aliphatic divalent hydrocarbon group having 2 to 10 carbon atoms having a carbon-carbon double bond. The alkenylene group may be a substituted or unsubstituted alkenylene group having 2 to 6 carbon atoms, or a substituted or unsubstituted alkenylene group having 2 to 4 carbon atoms. For example, one or more hydrogen atoms included in the alkenylene group may be substituted in the same way as the above-described cycloalkylene group.

The substituted or unsubstituted alkynylene group having 2 to 10 carbon atoms refers to a substituted or unsubstituted straight-chain or branched aliphatic divalent hydrocarbon group having 2 to 10 carbon atoms having a carbon-carbon triple bond. The alkynylene group may be a substituted or unsubstituted alkynylene group having 2 to 6 carbon atoms, or a substituted or unsubstituted alkynylene group having 2 to 4 carbon atoms. For example, one or more hydrogen atoms included in the alkynylene group may be substituted in the same way as the above-described cycloalkylene group.

The substituted or unsubstituted arylene group having 6 to 20 carbon atoms refers to a substituted or unsubstituted divalent carbocyclic aromatic system having 6 to 30 carbon atoms including one or more rings, as used singly or in combination, and the rings may be attached or combined together by the pendant method. The arylene group may be a substituted or unsubstituted arylene group having 6 to 18 carbon atoms or a substituted or unsubstituted arylene group having 6 to 15 carbon atoms, and may include a phenyl group, a naphthyl group, and a biphenyl group. For example, one or more hydrogen atoms included in the arylene group may be substituted in the same way as the cycloalkylene group.

In a specific embodiment of the present disclosure, the A may be any one selected from the group consisting of substituted or unsubstituted, cyclohexylene group, cyclohexylenedimethylene($CH_2$—$C_6H_6$—$CH_2$) group, cyclohexylenediethylene($(CH_2)_2$—$C_6H_6$—$(CH_2)_2$) group, cyclohexylenedipropylene($(CH_2)_3$—$C_6H_6$—$(CH_2)_3$) group, cyclohexylenedibutylene($(CH_2)_4$—$C_6H_6$—$(CH_2)_4$) group, methylenedicyclohexylene($C_6H_6$—$CH_2$—$C_6H_6$) group, ethylenedicyclohexylene($C_6H_6$—$(CH_2)_2$—$C_6H_6$) group, propylenedicyclohexylene($C_6H_6$—$(CH_2)_3$—$C_6H_6$) group, and butylenedicyclohexylene($C_6H_6$—$(CH_2)_4$—$C_6H$) group.

The B may be any one selected from the group consisting of substituted or unsubstituted, methylene group, ethylene group, propylene group, isopropylene group, butylene group, sec-butylene group, t-butylene group, n-butylene group, pentylene group, hexylene group, cyclopropylene group, cyclobutylene group, cyclopentylene group, cyclohexylene group, and phenylene group.

In a specific embodiment of the present disclosure, the alicyclic urea diol compound may comprise at least one of 1,1'-(cyclohexane-1,2-diyl)bis-(3-(hydroxymethyl)urea), 1,1'-(cyclohexane-1,3-diyl)bis-(3-(hydroxymethyl)urea), 1,1'-cyclohexane-1,4-diyl)bis-(3-(hydroxymethyl)urea), 1,1'-(cyclohexane-1,2-diyl)bis-(3-(hydroxyethyl)urea), 1,1'-(cyclohexane-1,3-diyl)bis-(3-(hydroxyethyl)urea), 1,1'-cyclohexane-1,4-diyl)bis-(3-(hydroxyethyl)urea), 1,1'-(cyclohexane-1,2-diylbis(methylene))bis-(3-(hydroxymethyl)urea), 1,1'-(cyclohexane-1,3-diylbis(methylene))bis-(3-(hydroxymethyl)urea), 1,1'-cyclohexane-1,4-diylbis(methylene))bis-(3-(hydroxymethyl)urea), 1,1'-(cyclohexane-1,2-diylbis(methylene))bis-(3-(hydroxyethyl)urea), 1,1'-(cyclohexane-1,3-diylbis(methylene))bis-(3-(hydroxyethyl)urea), or 1,1'-cyclohexane-1,4-diylbis(methylene))bis-(3-(hydroxyethyl)urea).

In an embodiment of the present disclosure, the alicyclic urea diol compound may be present in an amount of 0.5 to 50 parts by weight, 0.1 to 0.5 parts by weight, 1 to 15 parts by weight, 15 to 25 parts by weight, or 30 to 40 parts by weight based on 100 parts by weight of the OH group-containing polymer. When the amount of the alicyclic urea diol compound satisfies the above-described range, it is possible to improve the reaction safety of the composition for forming a polyurethane film, and provide a polyurethane film derived from the composition for forming a polyurethane film with the improved self-healable property from tear.

In another aspect of the present disclosure, there is provided a polyurethane film derived from the composition for forming a polyurethane film. The polyurethane film may be a linear polyurethane film, and may be a crosslinked polyurethane film.

The conventional polyurethane has weak hydrogen bonds between urethane, thus it is difficult to automatically heal tear by itself. However, a polyurethane film derived from the composition for forming a polyurethane film according to the present disclosure may have a self-healable property from tear by strong hydrogen bonds between urethane in a urea group derived from an alicyclic urea diol compound and an NH group in urethane. The polyurethane film may be formed by stirring and mixing an OH group-containing polymer, a curing agent, an alicyclic urea diol compound and a solvent to prepare a composition for forming a polyurethane film; and coating the composition for forming a polyurethane film on a substrate and drying the composition.

The composition for forming a polyurethane film may be obtained by mixing the OH group-containing polymer, the curing agent, the alicyclic urea diol compound and the solvent, and may be obtained by preparing a solution like an OH group-containing polymer solution, a curing agent solution and an alicyclic urea diol compound solution, and stirring and mixing the solutions at room temperature (for example, 25° C.).

In the step of forming the composition for forming a polyurethane film, the stirring and mixing may be performed for a short time, for example, 1 to 30 min, 10 min to 30 min, or 10 to 15 min.

The drying may be performed, for example, at 50 to 200° C. for 10 to 120 min, but is not limited thereto.

The method may further comprise degassing the composition for forming a polyurethane film between the step of preparing the composition for forming a polyurethane film and the step of coating the composition on the substrate and drying the composition. The degassing may be performed, for example, for 1 to 20 min, but is not limited thereto.

The reaction for forming the polyurethane film, i.e., urethane reaction, may be performed by reaction between the OH group contained at the terminal of the side chain of the OH group-containing polymer and the isocyanate group of the curing agent. In this instance, as described above, the alicyclic urea diol compound having two OH groups may participate in the curing reaction with the multifunctional isocyanate compound.

The composition may further comprise well-known additives, for example, chain extension agents, binding inhibitors, antistatic agents, antioxidants, biological stabilizing agents, chemical blowing agents, release agents, flame retardants, lubricants, colorants, flow improvers, fillers, adhesion promoters, catalysts, photostabilizers, brighteners, organic phosphorus compounds, oils, dyes, impact modifiers, reinforcing agents, reinforced fibers, weatherproofing agents and plasticizers.

Additionally, according to another aspect of the present disclosure, there is provided an article comprising a substrate; and the above-described polyurethane film positioned on at least one surface of the substrate.

The substrate according to an embodiment of the present disclosure may be a metal substrate, a glass substrate or a polymer substrate.

Specific examples of the articles may be transport equipment, for example, vehicles, aircraft and vessels, and information and electronic products, for example, tablet PCs, displays, smartphones and wearable devices, and articles in various fields, for example, defense and security products, household products and construction/industrial products.

Hereinafter, examples will be described in detail to help the understanding of the present disclosure. However, the examples of the present disclosure may be modified in other different forms, and the scope of the present disclosure should not be construed as being limited to the following examples. The examples of the present disclosure are provided to fully explain the present disclosure to those having ordinary knowledge in the art to which the present disclosure pertains.

Example 1

Preparation of a Composition for Forming a Polyurethane Film

Styrene, butylacrylate, 2-hydroxypropylmethacrylate, butylmethacrylate (20 mol %, 16 mol %, 41 mol %, 23 mol % in mol % respectively) as a comonomer and butyl acetate as a solvent were mixed to prepare a comonomer solution such that the total comonomer concentration was 50 wt %. Subsequently, 3 weight % of 2,2-azobisisobutyronitrile (AIBN) as an initiator was added to the comonomer solution based on the total comonomer solution, followed by radical polymerization in the reaction conditions of 120° C. and 6 hours, to finally prepare an OH group-containing polymer containing an OH group attached to the side chain.

The alicyclic urea diol compound was prepared by reaction between 1,3-bis(isocyanatomethyl)cyclohexane and 2-aminoethanol at a mole ratio of 1:1.

70 parts by weight of the prepared OH group-containing polymer, 25 parts by weight of 1,3,5-triazine-2,4,6(1H, 3G, 5H)trione (available from Sigma-Aldrich) as a curing agent, and 5 parts by weight of the prepared alicyclic urea diol compound were mixed and butyl acetate was introduced such that the final concentration was 50 wt %. It was stirred at room temperature for 3 min using a paste mixer and degassed for 2 min to prepare a composition for forming a polyurethane film. In this instance, a ratio of the total number of isocyanate groups in the curing agent to the sum of the OH group in the OH group-containing polymer and in the alicyclic urea diol compound (a ratio of NCO/OH numbers) was 1.

Preparation of a Polyurethane Film

The prepared composition for forming a polyurethane film was coated on an iron substrate in the loading amount of 100 g/cm$^2$, and dried at 150° C. for 30 min to prepare a polyurethane film.

Example 2

A composition for forming a polyurethane film and a polyurethane film were prepared in the same way as example 1, except that 72 parts by weight of OH group-containing polymer, 25 parts by weight of 1,3,5-triazine-2,4,6(1H, 3G, 5H)trione (available from Sigma-Aldrich) as a curing agent, and 3 parts by weight of alicyclic urea diol compound were used.

Example 3

A composition for forming a polyurethane film and a polyurethane film were prepared in the same way as example 1, except that 74 parts by weight of OH group-containing polymer, 25 parts by weight of 1,3,5-triazine-2,4,6(1H, 3G, 5H)trione (available from Sigma-Aldrich) as a curing agent, and 1 part by weight of alicyclic urea diol compound were used.

Comparative Example 1

Preparation of a Composition for Forming a Polyurethane Film

An OH group-containing polymer was prepared in the same way as example 1.

70 parts by weight of the prepared OH group-containing polymer, 2.5 parts by weight of 1,3-bis(isocyanatomethyl)cyclohexane, 2.5 parts by weight of 2-aminoethanol, and 25 parts by weight of 1,3,5-triazine-2,4,6(1H, 3G, 5H)trione (available from Sigma-Aldrich) were simultaneously mixed to prepare a composition for forming a polyurethane film.

Comparative Example 2

A composition for forming a polyurethane film and a polyurethane film were prepared by the same method as example 1 except that an alicyclic urea diol compound was not included.

Evaluation Example

Reaction Stability

The composition for forming a polyurethane film prepared in each of example 1 and comparative example 1 was put in a transparent container, and after 3 months, the transparency of the composition was observed with a naked eye. As a result, as can be seen from FIG. 1, the composition of example 1 was transparent as obtained immediately after reaction, while the composition of comparative example 1 became opaque, and thus it was determined that reaction occurred in the composition of comparative example 1.

Self-Healable Property

For the polyurethane film finally obtained in each of examples 1 to 3 and comparative example 2, stimuli was applied using an iso-tip of 5N hardness. After that, self-healing behaviors at the glass transition temperature of +20° C. was imaged, and the result was shown in FIG. 2.

Figure 2:
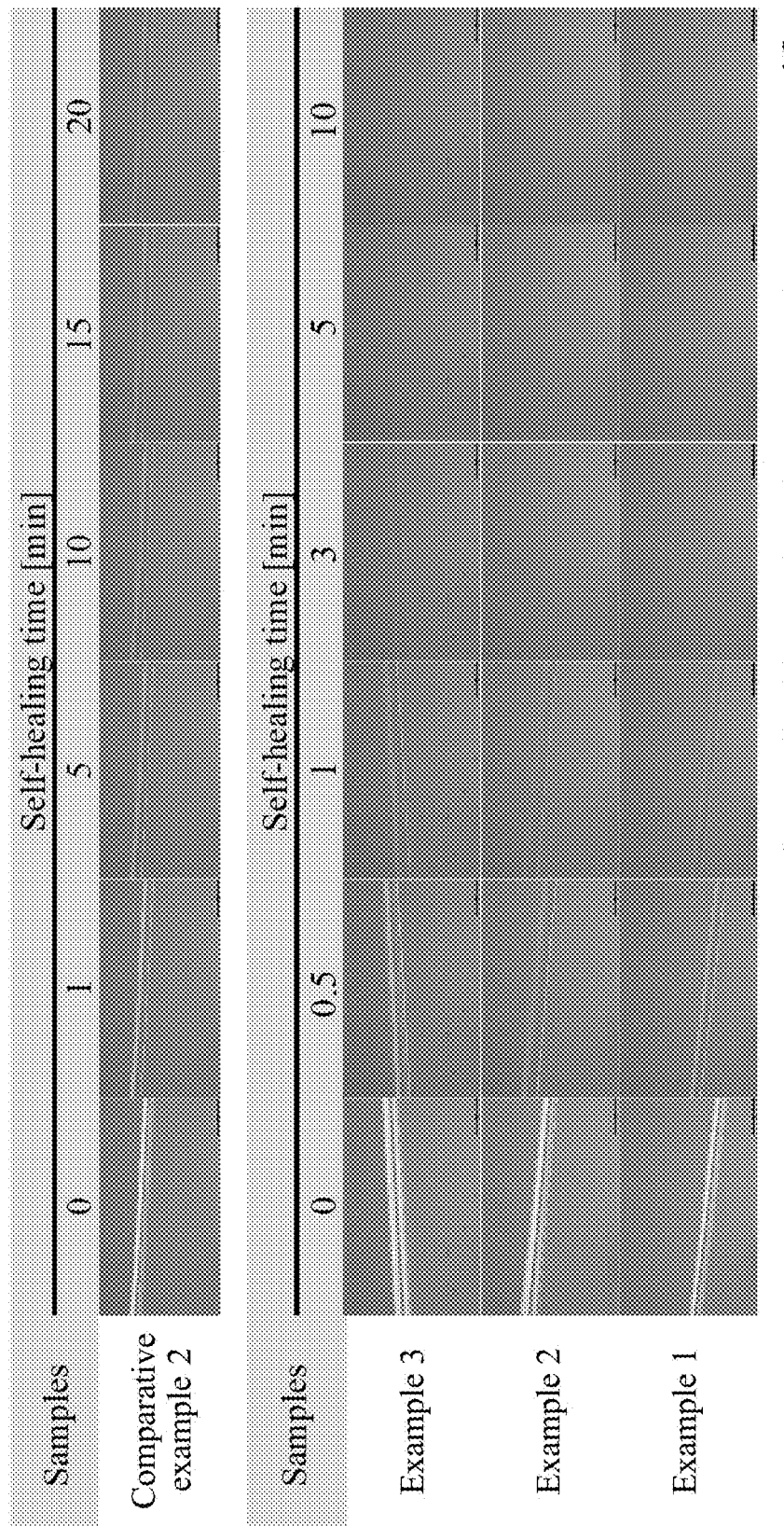
FIG. 2 is a photographic image showing the self-healable property of a polyurethane film obtained from each of examples 1 to 3 and comparative example 1 over time.

As can be seen from FIG. 2, the polyurethane films of examples 1 to 3 showed self-healing in about 0.5 min (30 sec), while the polyurethane film of comparative example 2 did not show self-healing even in 10 min.

What is claimed is:

1. A composition for forming a polyurethane film, comprising:
an OH group-containing polymer; an isocyanate-based compound as a curing agent; and an alicyclic urea diol compound having two urea groups and an OH group at two terminals, wherein the alicyclic urea diol compound is included in an amount of 0.1 to 30 parts by weight based on 100 parts by weight of the OH group-containing polymer,
wherein the OH group-containing polymer comprises a polymer comprising a repeat unit derived from an OH group-containing acrylate-based monomer, an OH group-containing methacrylate-based monomer, and an OH group-containing styrene-based monomer.

2. The composition for forming a polyurethane film according to claim 1, wherein the alicyclic urea diol compound is represented by the following Formula 1:

[Formula 1]

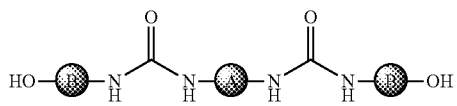

where A is any one selected from the group consisting of a substituted or unsubstituted cycloalkylene group having 3 to 30 carbon atoms, a substituted or unsubstituted cycloalkylenedialkylene group having 5 to 30 carbon atoms, and a substituted or unsubstituted alkylenedicycloalkylene group having 7 to 30 carbon atoms, and B is any one selected from the group consisting of a substituted or unsubstituted alkylene group having 1 to 10 carbon atoms, a substituted or unsubstituted alkenylene group having 2 to 10 carbon atoms, a substituted or unsubstituted alkynylene group having 2 to 10 carbon atoms, a substituted or unsubstituted cycloalkylene group having 3 to 10 carbon atoms, and a substituted or unsubstituted arylene group having 6 to 20 carbon atoms; or a combination of two or more thereof to form a divalent linking group.

3. The composition for forming a polyurethane film according to claim 2, wherein the A is any one selected from the group consisting of substituted or unsubstituted, cyclohexylene group, cyclohexylenedimethylene group, cyclohexylenediethylene group, cyclohexylenedipropylene group, cyclohexylenedibutylene group, methylenedicyclohexylene group, ethylenedicyclohexylene group, propylenedicyclohexylene group, and butylenedicyclohexylene group, and the B is any one selected from the group consisting of substituted or unsubstituted, methylene group, ethylene group, propylene group, isopropylene group, butylene group, sec-butylene group, t-butylene group, n-butylene group, pentylene group, hexylene group, cyclopropylene group, cyclobutylene group, cyclopentylene group, cyclohexylene group, and phenylene group.

4. The composition for forming a polyurethane film according to claim 1, wherein the alicyclic urea diol compound comprises at least one of 1,1'-(cyclohexane-1,2-diyl)bis-(3-(hydroxymethyl)urea), 1,1'-(cyclohexane-1,3-diyl)bis-(3-(hydroxymethyl)urea), 1,1'-cyclohexane-1,4-diyl)bis-(3-(hydroxymethyl)urea), 1,1'-(cyclohexane-1,2-diyl)bis-(3-(hydroxyethyl)urea), 1,1'-(cyclohexane-1,3-diyl)bis-(3-(hydroxyethyl)urea), 1,1'-cyclohexane-1,4-diyl)bis-(3-(hydroxyethyl)urea), 1,1'-(cyclohexane-1,2-diylbis(methylene))bis-(3-(hydroxymethyl)urea), 1,1'-(cyclohexane-1,3-diylbis(methylene))bis-(3-(hydroxymethyl)urea), 1,1'-cyclohexane-1,4-diylbis(methylene))bis-(3-(hydroxymethyl)urea), 1,1'-(cyclohexane-1,2-diylbis(methylene))bis-(3-(hydroxyethyl)urea), 1,1'-(cyclohexane-1,3-diylbis(methylene))bis-(3-(hydroxyethyl)urea), or 1,1'-cyclohexane-1,4-diylbis(methylene))bis-(3-(hydroxyethyl)urea).

5. A polyurethane film derived from the composition for forming a polyurethane film according to claim 1.

6. An article, comprising:
a substrate, and the polyurethane film according to claim 5, positioned on at least one surface of the substrate.

7. The article according to claim 6, wherein the substrate is a metal substrate, a glass substrate or a polymer substrate.

* * * * *